US012567643B2

(12) United States Patent
　Raettich

(10) Patent No.:　US 12,567,643 B2
(45) Date of Patent:　Mar. 3, 2026

(54) BATTERY HOUSING WITH VALVE DEVICE, BATTERY AND MOTOR VEHICLE

(71) Applicant: Bayerische Motoren Werke Aktiengesellschaft, Munich (DE)

(72) Inventor: Philip Raettich, Stoettwang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 635 days.

(21) Appl. No.: 17/921,490

(22) PCT Filed: Mar. 29, 2021

(86) PCT No.: PCT/EP2021/058106
　§ 371 (c)(1),
　(2) Date: Oct. 26, 2022

(87) PCT Pub. No.: WO2021/219309
　PCT Pub. Date: Nov. 4, 2021

(65) Prior Publication Data
　US 2023/0198086 A1　Jun. 22, 2023

(30) Foreign Application Priority Data
　Apr. 27, 2020　(DE) ..................... 10 2020 111 372.2

(51) Int. Cl.
　*H01M 50/333*　(2021.01)
　*F16K 17/02*　(2006.01)
　*F16K 17/04*　(2006.01)
(52) U.S. Cl.
　CPC ......... *H01M 50/333* (2021.01); *F16K 17/025* (2013.01); *F16K 17/0413* (2013.01)

(58) Field of Classification Search
　CPC ................ H01M 50/333; F16K 17/025; F16K 17/0413
　See application file for complete search history.

(56) References Cited

U.S. PATENT DOCUMENTS

| | | | |
|---|---|---|---|
| 5,660,944 | A | 8/1997 | Sprengel et al. |
| 2013/0032219 | A1 | 2/2013 | Heim et al. |

(Continued)

FOREIGN PATENT DOCUMENTS

| | | | |
|---|---|---|---|
| DE | 44 11 289 | A1 | 10/1995 |
| DE | 10 2014 111 041 | A1 | 2/2016 |

(Continued)

OTHER PUBLICATIONS

International Search Report (PCT/ISA/210) issued in PCT Application No. PCT/EP2021/058106 dated May 31, 2021 with English translation (five (5) pages).

(Continued)

*Primary Examiner* — Niki Bakhtiari
*Assistant Examiner* — Dustin Van Kirk
(74) *Attorney, Agent, or Firm* — Crowell & Moring LLP

(57) ABSTRACT

A battery housing includes a valve device for pressure equalization and for letting out a hot gas of a battery cell. The valve device has a valve seat in the form of a gas release opening in a housing wall of the battery housing and a valve body. The valve body closes the gas release opening when in a closed position, can be moved by a pressure-difference-induced internal pressure increase into a first open position in which the valve body reversibly opens the gas release opening to provide pressure equalization, and can be moved by a hot-gas-induced internal pressure increase into a second open position in which the valve body irreversibly opens the gas release opening to let out the hot gas.

8 Claims, 2 Drawing Sheets

(56)  References Cited

U.S. PATENT DOCUMENTS

2016/0036025 A1\*  2/2016  Hofer .................. H01M 50/325
                                                    429/56
2018/0219200 A1\*  8/2018  Albukrek ............ H01M 50/333

FOREIGN PATENT DOCUMENTS

DE  10 2016 218 215  A1  3/2018
EP    2 554 882  A1  2/2013
JP    7-37568  A  2/1995

OTHER PUBLICATIONS

German-language Written Opinion (PCT/ISA/237) issued in PCT Application No. PCT/EP2021/058106 dated May 31, 2021 (five (5) pages).
German-language Search Report issued in German Application No. 10 2020 111 372.2 dated Dec. 7, 2020 with partial English translation (15 pages).

\* cited by examiner

BATTERY HOUSING WITH VALVE DEVICE, BATTERY AND MOTOR VEHICLE

BACKGROUND AND SUMMARY OF THE INVENTION

The invention relates to a battery housing for a battery of a motor vehicle, which is designed to receive at least one battery cell of the battery and which comprises at least one valve apparatus for pressure equalization in the event of a pressure difference between an interior space of the battery housing and a surrounding area of the battery housing and for discharging a hot gas, which is released into the interior space, of the at least one battery cell into the surrounding area of the battery housing. The invention moreover relates to a battery and to a motor vehicle.

In the present case, interest is directed to batteries for motor vehicles, which may be used for example as traction batteries for electrically drivable motor vehicles. Such a battery conventionally has a plurality of battery cells, which are arranged in an interior space of a battery housing of the battery. In the event of a fault, for example in the event of a short-circuit within the cell, of one of the battery cells, it may perform emergency degassing by discharging a hot gas from its cell housing into the interior space of the battery housing. In order to divert the hot gas out of the interior space, the battery housing conventionally has at least one valve apparatus, which is arranged on a housing wall of the battery housing. Such a valve apparatus may have a rupture membrane, which yields, for example tears or ruptures, in the event of the hot gas arising in the interior space, and as a result a degassing opening in the housing wall opens up for the purpose of discharging the hot gas into a surrounding area of the battery. Such rupture membranes can also be permeable to air, with the result that the valve apparatus is additionally designed for pressure equalization in the event of a pressure difference between the interior space and the surrounding area.

In order to be able to reliably discharge the hot gas, such rupture membranes have high sensitivity. However, as a result, the rupture membrane can also yield owing to external influences or environmental influences, for example owing to the action of water, and thus undesirably be destroyed. These environmental influences can then penetrate the interior space of the battery housing and damage the components located there.

It is an object of the present invention to be able to easily protect a battery of a motor vehicle against environmental influences.

This object is achieved according to a battery housing, a battery and a motor vehicle having the features according to the claimed invention.

A battery housing according to an embodiment of the invention for a battery of a motor vehicle is designed to receive at least one battery cell of the battery and has at least one valve apparatus. The valve apparatus is designed to equalize pressure in the event of a pressure difference between an interior space of the battery housing and a surrounding area of the battery housing and to discharge a hot gas, which is released into the interior space, of the at least one battery cell into the surrounding area of the battery housing. The at least one valve apparatus has a valve seat, in the form of a degassing opening in a housing wall of the battery housing, and a valve body, wherein the valve body covers the degassing opening in a closed position and can be moved out of the closed position by way of an increase in an internal pressure in the interior space of the battery housing.

The valve body can be moved into a first open position, in which the valve body reversibly opens up the degassing opening in order to provide the pressure equalization, by way of an internal pressure increase resulting from the pressure difference, and can be moved into a second open position, in which the valve body irreversibly opens up the degassing opening in order to discharge the hot gas, by way of an internal pressure increase resulting from the hot gas.

The invention moreover relates to a battery for a motor vehicle having at least one battery cell and a battery housing according to an embodiment of the invention, which is designed to receive the at least one battery cell. The rechargeable battery or the accumulator is in particular in the form of a traction battery for an electrically drivable motor vehicle. The battery is preferably in the form of a high-voltage energy store. The battery has in particular a plurality of battery cells arranged in the interior space of the battery housing. The battery cells may for example be in the form of prismatic battery cells, round cells or pouch cells. In the event of a fault, for example in the event of a short-circuit within the cell, of a battery cell, this battery cell can discharge a hot gas into the interior space of the battery housing to reduce the pressure.

The battery housing has housing walls, for example in the form of a housing bottom part or housing base and a housing upper part or housing cover, which enclose the interior space for receiving the battery cells. The at least one valve apparatus is arranged on at least one of the housing walls, for example on the housing cover. The valve apparatus has the valve seat, which is in the form of the degassing opening. The degassing opening is a through-opening in the housing wall. Moreover, the valve apparatus has the valve body, which seals the valve seat and in addition can close or cover the degassing opening. The valve body seals the degassing opening and therefore the battery housing in particular in a gas-tight manner. The valve apparatus is preferably in the form of a disk valve apparatus and has a valve body in the form of a cap-like sealing disk, which is arranged on the outer side of the housing wall overlapping the degassing opening. Moreover, the valve body can be pressed out of the valve seat as a result of the increase in the internal pressure and therefore open up the degassing opening, in order to reduce the internal pressure in the battery housing. In this respect, the increase in the internal pressure can be caused for example by a pressure difference, resulting from the surrounding area or from the weather, between the interior space of the battery housing and the surrounding area. Such a pressure difference resulting from the surrounding area occurs for example when the motor vehicle is traveling uphill. The increase in the internal pressure can also be caused by hot gas of at least one battery cell in the interior space of the battery housing.

In this respect, the valve apparatus can be opened reversibly, that is to say only temporarily, or irreversibly, that is to say permanently, depending on whether the internal pressure increase in the interior space of the battery housing results from a pressure difference or hot gas. In particular, the valve body can be moved into the first open position if the internal pressure exceeds a first threshold value and falls below a second threshold value, and can be moved back into the closed position if the internal pressure falls below the first threshold value again. Thus, if the internal pressure is between the first and the second threshold value, there is an internal pressure increase resulting from a pressure difference. This internal pressure increase resulting from a pressure difference moves the valve body out of the closed position into the first open position, in which the valve body opens up the degassing opening reversibly, that is to say only temporarily. In this way, an air stream can be admitted between the internal space and the surrounding area to equalize the pressure. As soon as the internal pressure increase resulting from a pressure difference has been reduced, the valve body returns to the closed position again and seals the valve seat again. In the first open position, the valve body does not have to assume a discrete position with respect to the degassing opening, but rather can assume different positions depending on the internal pressure exceeding the first threshold value. For example, the valve body may be removed further away from the degassing opening the greater the internal pressure that remains below the second threshold value.

In particular, the valve body can be moved into the second open position and fixed there for the purpose of providing the irreversible opening-up of the degassing opening if the internal pressure exceeds the second threshold value. Thus, if the internal pressure exceeds the second threshold value, there is an internal pressure increase resulting from a hot gas. The increase in the internal pressure resulting from a hot gas beyond the second threshold value thus moves the valve body out of the closed position or the first open position into the second open position, in which the valve body irreversibly, that is to say permanently, opens up the degassing opening. In this way, it is possible for the hot gas to escape via the degassing opening into the surrounding area for emergency degassing. By virtue of the fact that the valve apparatus remains permanently open as a result of fixing the valve body in the second open position, it is possible to prevent the valve apparatus from undesirably closing again before the hot gas has completely escaped from the internal space. The second open position can thus not be released by way of reducing the internal pressure, in contrast with the first open position.

Such a valve apparatus having a valve body is especially robust against environmental influences and can additionally provide both pressure equalization and emergency degassing.

It has proven to be advantageous if the valve apparatus has a resetting device, which is designed to permit the valve body to be raised with respect to the housing wall, as a result of the internal pressure increase resulting from a pressure difference, from the closed position into the first open position, with the result that the valve body opens up the degassing opening, and, after the internal pressure increase resulting from a pressure difference has been reduced, to provide a lowering of the valve body from the first open position back into the closed position with respect to the housing wall, with the result that the valve body seals the degassing opening again. The resetting device comprises in particular a spring, by way of which the valve body is fastened to the housing wall. For example, the spring may be arranged in the interior space of the battery housing and hold the valve body, for example the sealing disk arranged on the outer side of the housing wall, on the housing wall. For example, the resetting device may press the valve body into the valve seat and therefore seal the degassing opening, as soon as the internal pressure falls below the first threshold value, which depends on a resetting force of the resetting device. As soon as the internal pressure exceeds the first threshold value and therefore the resetting force of the resetting device, the internal pressure acts counter to the resetting force of the resetting device and slides the valve body out of the valve seat into the first open position. As soon as the internal pressure drops again and falls below the first threshold value, the valve body is pressed back into the valve seat as a result of the resetting force of the resetting device.

It may be provided that the valve apparatus comprises a fixing device designed to fix the valve body, which has been raised into the second open position by way of the internal pressure increase resulting from a hot gas, in the second open position in order to discharge the hot gas. In particular, the valve device comprises the resetting device and the fixing device. So long as the internal pressure is below the second threshold value, the resetting device ensures that the valve body can return to the closed position again as soon as the internal pressure falls below the first threshold value again. However, as soon as the internal pressure exceeds the second threshold value, the fixing device fixes the valve body in the second open position, with the result that the resetting device can also no longer return the valve body to the closed position, even if the internal pressure falls below the first threshold value again.

In one refinement of the invention, the fixing device is a snap-connection device and the valve body and the housing wall have mutually corresponding connecting elements, which snap into one another as soon as the valve body has moved into the second open position. For example, at least one first connecting element is in the form of an elastic snap hook element and at least one second connecting element is in the form of a rigid locking element with an undercut. The connecting elements snap into one another or latch together as soon as the internal pressure increase resulting from a hot gas has raised the valve body far enough from the housing wall. For example, at least one snap hook element may be arranged on the housing wall, while the valve body has at least one undercut in which a snap hook head of the snap hook element can be arranged.

The invention also relates to a motor vehicle which comprises a battery according to an embodiment of the invention. The motor vehicle is in particular in the form of an electric or hybrid vehicle.

The embodiments presented with regard to the battery housing according to the invention and the advantages of these embodiments apply correspondingly for the embodiments of the battery according to the invention and for the embodiments of the motor vehicle according to the invention.

Further features of the invention will become apparent from the claims, the figures and the description of the figures. The features and combinations of features mentioned in the description above and the features and combinations of features mentioned in the description of the figures below and/or shown in the figures alone may be used not only in the respectively specified combination but also in other combinations or individually.

The invention will now be explained in more detail on the basis of an exemplary embodiment and with reference to the drawings.

DETAILED DESCRIPTION OF THE DRAWINGS

In the figures, elements that are the same or have the same function are provided with the same reference signs.

Figure 1:
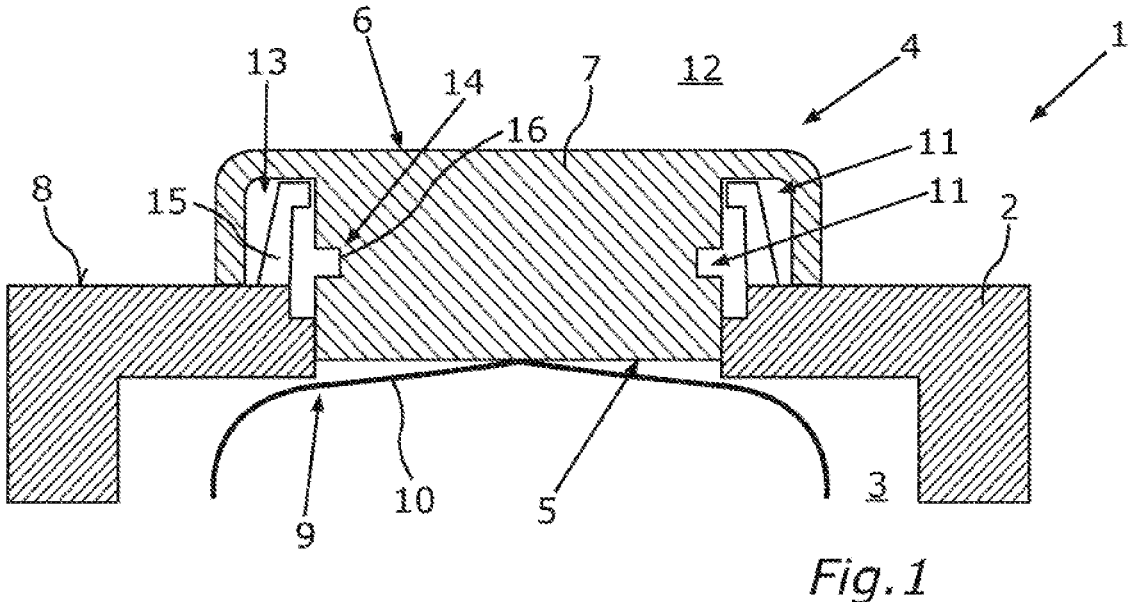
FIG. 1 shows a schematic illustration of a battery housing for a battery of a motor vehicle with a valve apparatus in a closed position.

FIG. 1 shows a battery housing 1 for a battery of a motor vehicle. The battery housing 1 has housing walls 2, which enclose an interior space 3 for receiving battery cells, not shown here, of the battery. A valve apparatus 4, which is designed to provide an internal pressure reduction of an internal pressure in the internal space 3 of the battery housing 1, is arranged in at least one housing wall 2. In addition, the valve apparatus 4 has a valve seat in the form of a degassing opening 5, which is arranged in one of the housing walls 2. Moreover, the valve apparatus 4 has a valve body 6, which in FIG. 1 is shown in a closed position and seals the degassing opening 5. The valve body 6 is in this instance in the form of a cap-like sealing disk 7 which is arranged on an outer side 8 of the housing wall 2 and in the closed position covers or seals the degassing opening 5, in particular in a gas-tight manner.

Figure 2:
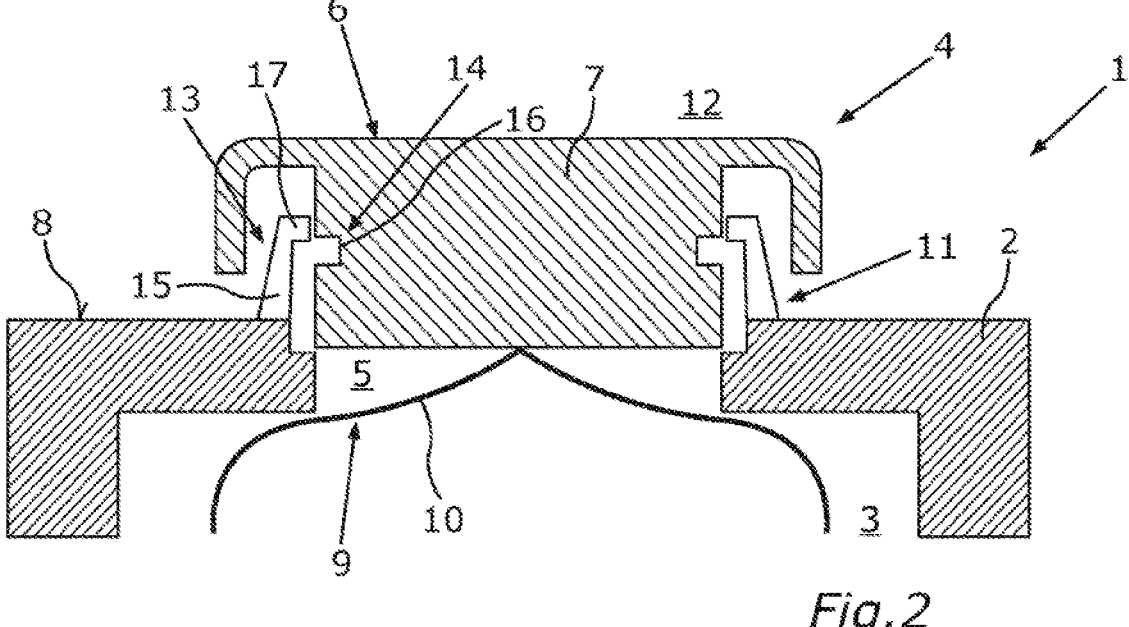
FIG. 2 shows the battery housing according to FIG. 1 with the valve apparatus in a first open position.

The valve apparatus 4 moreover has a resetting device 9 in the form of a spring 10 and a fixing device 11. The valve body 6 can be moved between the closed position and a first open position, as is shown in FIG. 2, by way of the resetting device 9. In the process, the valve body 6 is moved out of the closed position into the first open position as a result of an internal pressure increase, which results from a pressure difference between the interior space 3 and a surrounding area 12 of the battery housing 1. In this respect, the internal pressure for providing the first open position is between a first threshold value and a second threshold value. To provide the first open position, the valve body 6 is raised with respect to the housing wall 2, and therefore moved away from the degassing opening 5, as a result of the increasing internal pressure counter to a resetting force of the resetting device 9. As a result, it opens up the degassing opening 5 temporarily or reversibly, with the result that it is possible to equalize the pressure between the interior space 3 and the surrounding area 12. As soon as the elevated internal pressure has been reduced and the internal pressure falls below the first threshold value again, the resetting device 9 draws the valve body 6 back to the housing wall 2 and presses it onto the degassing opening 5 again. The valve body 6 is then in the closed position again.

Figure 3:
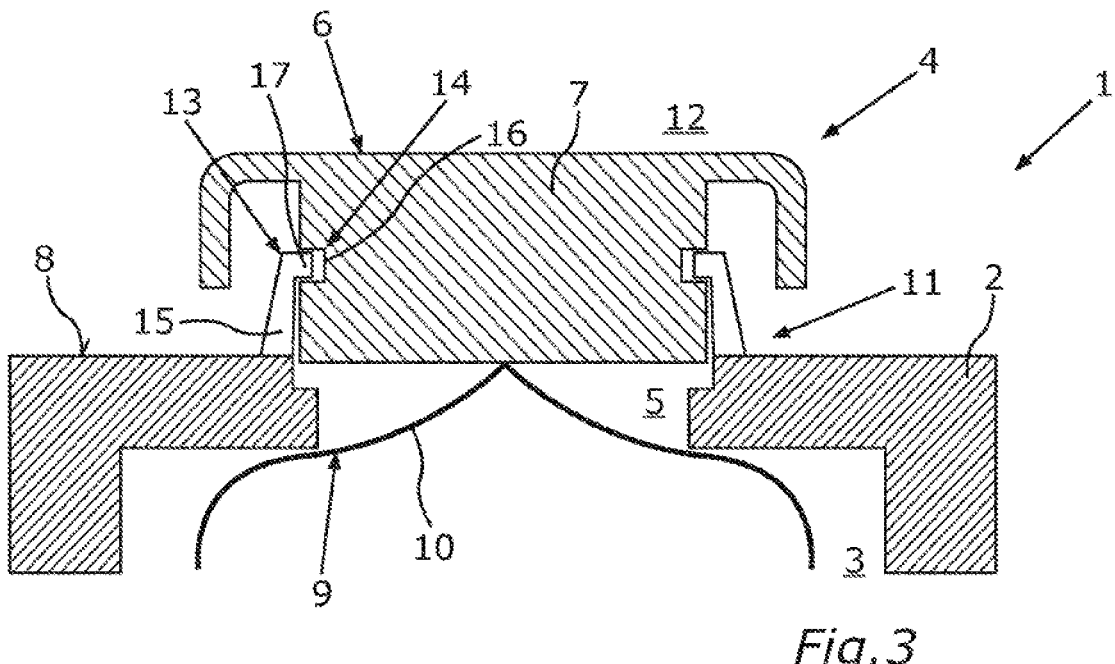
FIG. 3 shows the battery housing according to FIG. 1 with the valve apparatus in a second open position.

If the internal pressure increase is an internal pressure increase resulting from a hot gas, which was caused by hot gas of at least one battery cell in the interior space 3 and as a result of which the internal pressure exceeds the second threshold value, the valve body 6 is moved beyond the first open position into a second open position and fixed there by way of the fixing device 11. The second open position is shown in FIG. 3. In this instance, the fixing device 11 is a snap connection device, which comprises two connecting elements 13, 14. Here, one first connecting element 13 is an elastic snap hook 15, which in this instance is arranged on the housing wall 2. One second connecting element 14 is a locking element in the form of an undercut 16, which is arranged on the valve body 6, in this instance on a collar-like region of the cap-like sealing disk 7. So long as the internal pressure is between the first and the second threshold value, a snap hook head 17 of the snap hook 15 glides along the valve body 6, without becoming arranged in the undercut 16 in the process. However, as soon as the internal pressure exceeds the second threshold value, the valve body 6 is raised far enough with respect to the housing wall 2 that the snap hook head 17 becomes arranged in the undercut 16. As a result, the connecting elements 13, 14 snap or latch into one another and fix the valve body 6 in the second open position. In this second open position, the hot gas can escape from the interior space 3 into the surrounding area 12.

What is claimed is:

1. A battery housing for a battery of a motor vehicle, which is configured to receive at least one battery cell of the battery, the battery housing comprising:

a valve apparatus for equalizing pressure in an event of a pressure difference between an interior space of the battery housing and a surrounding area of the battery housing and for discharging a hot gas, which is released into the interior space, of the at least one battery cell into the surrounding area of the battery housing, wherein:

the valve apparatus has a valve seat, in a form of a degassing opening in a housing wall of the battery housing, and a valve body, the valve body closes the degassing opening in a closed position, is movable into a first open position, in which the valve body reversibly opens up the degassing opening in order to provide the pressure equalization, by way of an internal pressure increase resulting from a pressure difference, and is movable into a second open position, in which the valve body irreversibly opens up the degassing opening in order to discharge the hot gas, by way of an internal pressure increase resulting from the hot gas, the valve apparatus comprises a fixing device configured to fix the valve body, which has been raised into the second open position by way of the internal pressure increase resulting from the hot gas, in the second open position in order to discharge the hot gas, the fixing device is a snap connection device, and the valve body and the housing wall have mutually corresponding connecting elements, which snap into one another as soon as the valve body has moved into the second open position.

2. The battery housing according to claim 1, wherein:

the valve body is movable into the first open position if the internal pressure exceeds a first threshold value and falls below a second threshold value, and is movable back into the closed position if the internal pressure falls below the first threshold value again, and the valve body is movable into the second open position and fixed at the second open position if the internal pressure exceeds the second threshold value.

3. The battery housing according to claim 1, wherein the valve apparatus is in a form of a disk valve apparatus and has a valve body in a form of a cap-like sealing disk, which is arranged on an outer side of the housing wall overlapping the degassing opening.

4. The battery housing according to claim 1, wherein the valve apparatus has a resetting device, which is configured to permit the valve body to be raised with respect to the housing wall, as a result of the internal pressure increase resulting from a pressure difference, from the closed position into the first open position, with a result that the valve body opens up the degassing opening, and, after the internal pressure increase resulting from the pressure difference has been reduced, to provide a lowering of the valve body from the first open position back into the closed position with respect to the housing wall, with a result that the valve body seals the degassing opening again.

5. The battery housing according to claim 4, wherein the resetting device comprises a spring, by way of which the valve body is fastened to the housing wall.

6. The battery housing according to claim 1, wherein:

at least one first connecting element of the connecting elements is in a form of an elastic snap hook element, and

7

8 at least one second connecting element of the connecting elements is in a form of a rigid locking element with an undercut.

7. A battery for a motor vehicle, the battery comprising:

at least one battery cell, and the battery housing according to claim 1, wherein the battery housing is configured to receive the at least one battery cell.

8. A motor vehicle comprising the battery according to claim 7.

* * * * *